(12) United States Patent  (10) Patent No.: US 9,965,761 B2
Elangovan et al.  (45) Date of Patent: May 8, 2018

(54) METHODS AND APPARATUS FOR PROVIDING SECURE IDENTIFICATION, PAYMENT PROCESSING AND/OR SIGNING USING A GESTURE-BASED INPUT DEVICE

(71) Applicant: Nod Inc., Santa Clara, CA (US)

(72) Inventors: Anusankar Elangovan, San Francisco, CA (US); Subash R. Patel, Sunnyvale, CA (US)

(73) Assignee: NOD, INC., Santa Clara, CA (US)

( * ) Notice: Subject to any disclaimer, the term of this patent is extended or adjusted under 35 U.S.C. 154(b) by 414 days.

(21) Appl. No.: 14/591,880

(22) Filed: Jan. 7, 2015

(65) Prior Publication Data

US 2015/0220922 A1  Aug. 6, 2015

Related U.S. Application Data

(60) Provisional application No. 61/924,685, filed on Jan. 7, 2014.

(51) Int. Cl.
    *G06K 5/00*  (2006.01)
    *G06Q 20/40*  (2012.01)
    *G06F 3/01*  (2006.01)
    *G06K 9/00*  (2006.01)

(52) U.S. Cl.
    CPC ............ *G06Q 20/40* (2013.01); *G06F 3/014* (2013.01); *G06F 3/017* (2013.01); *G06K 9/00362* (2013.01)

(58) Field of Classification Search
    USPC ........................... 235/379, 380, 382
    See application file for complete search history.

(56) References Cited

U.S. PATENT DOCUMENTS

| 8,819,812 | B1* | 8/2014 | Weber | G06F 3/017 |
| | | | | 726/18 |
| 8,928,587 | B1* | 1/2015 | Smus | H04W 4/006 |
| | | | | 345/156 |
| 2008/0091373 | A1* | 4/2008 | McGibbon | A61B 5/1121 |
| | | | | 702/95 |
| 2013/0265218 | A1* | 10/2013 | Moscarillo | G06F 3/017 |
| | | | | 345/156 |
| 2014/0196131 | A1* | 7/2014 | Lee | G06F 21/32 |
| | | | | 726/7 |
| 2014/0267024 | A1* | 9/2014 | Keller | G06F 3/017 |
| | | | | 345/156 |
| 2014/0347479 | A1* | 11/2014 | Givon | G06K 9/00342 |
| | | | | 348/143 |
| 2015/0077336 | A1 | 3/2015 | Elangovan | |
| 2015/0084859 | A1* | 3/2015 | Itzhaik | G06K 9/00355 |
| | | | | 345/156 |
| 2015/0177842 | A1* | 6/2015 | Rudenko | G06F 3/017 |
| | | | | 345/156 |

* cited by examiner

*Primary Examiner* — Tuyen K Vo
(74) *Attorney, Agent, or Firm* — Pillsbury Winthrop Shaw Pittman LLP

(57) ABSTRACT

Described are apparatus and methods for providing secure identification, payment processing and/or signing using a gesture-based input device without biometrics.

14 Claims, 10 Drawing Sheets

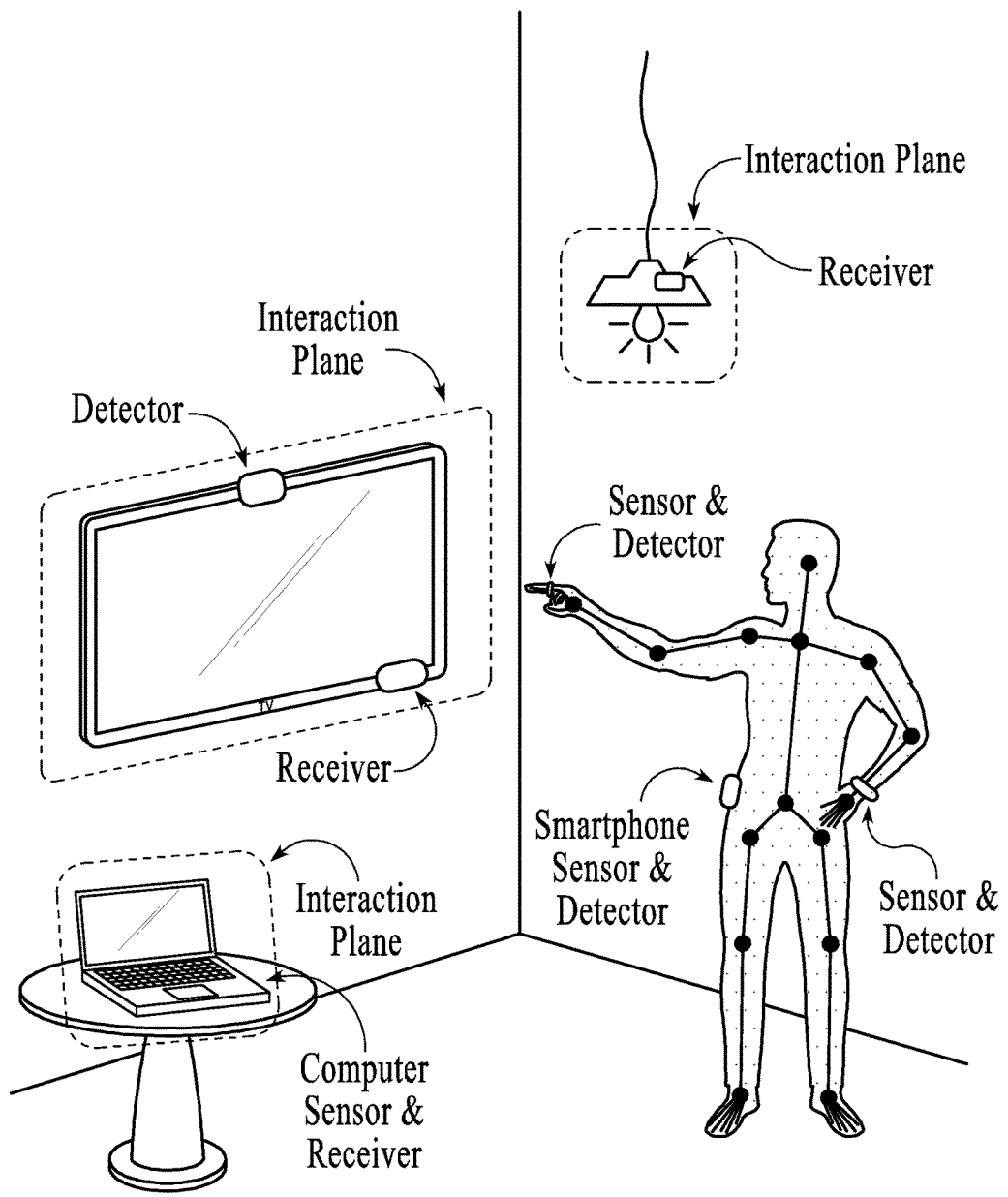
FIG. 1B/1

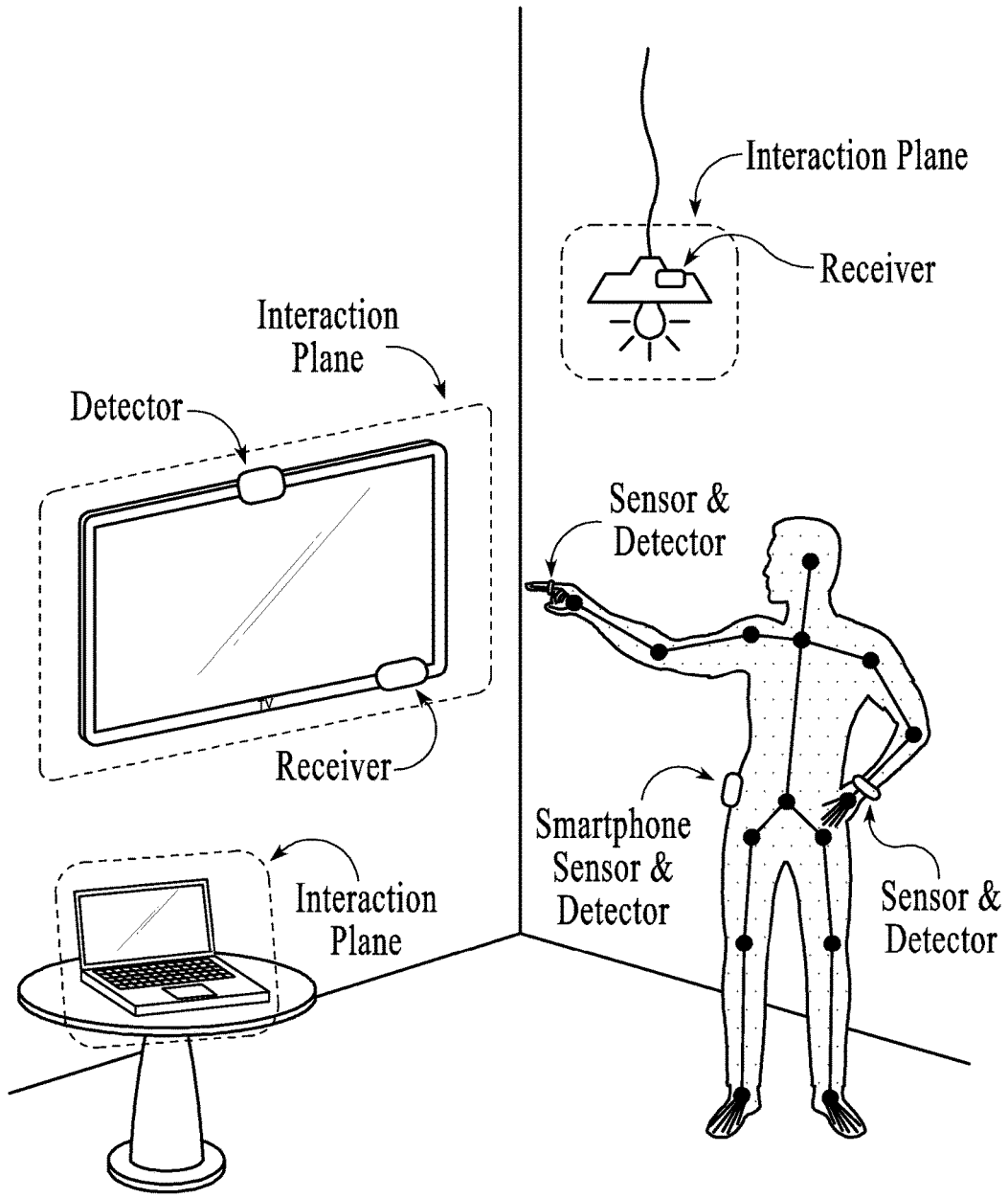
FIG. 1B/2

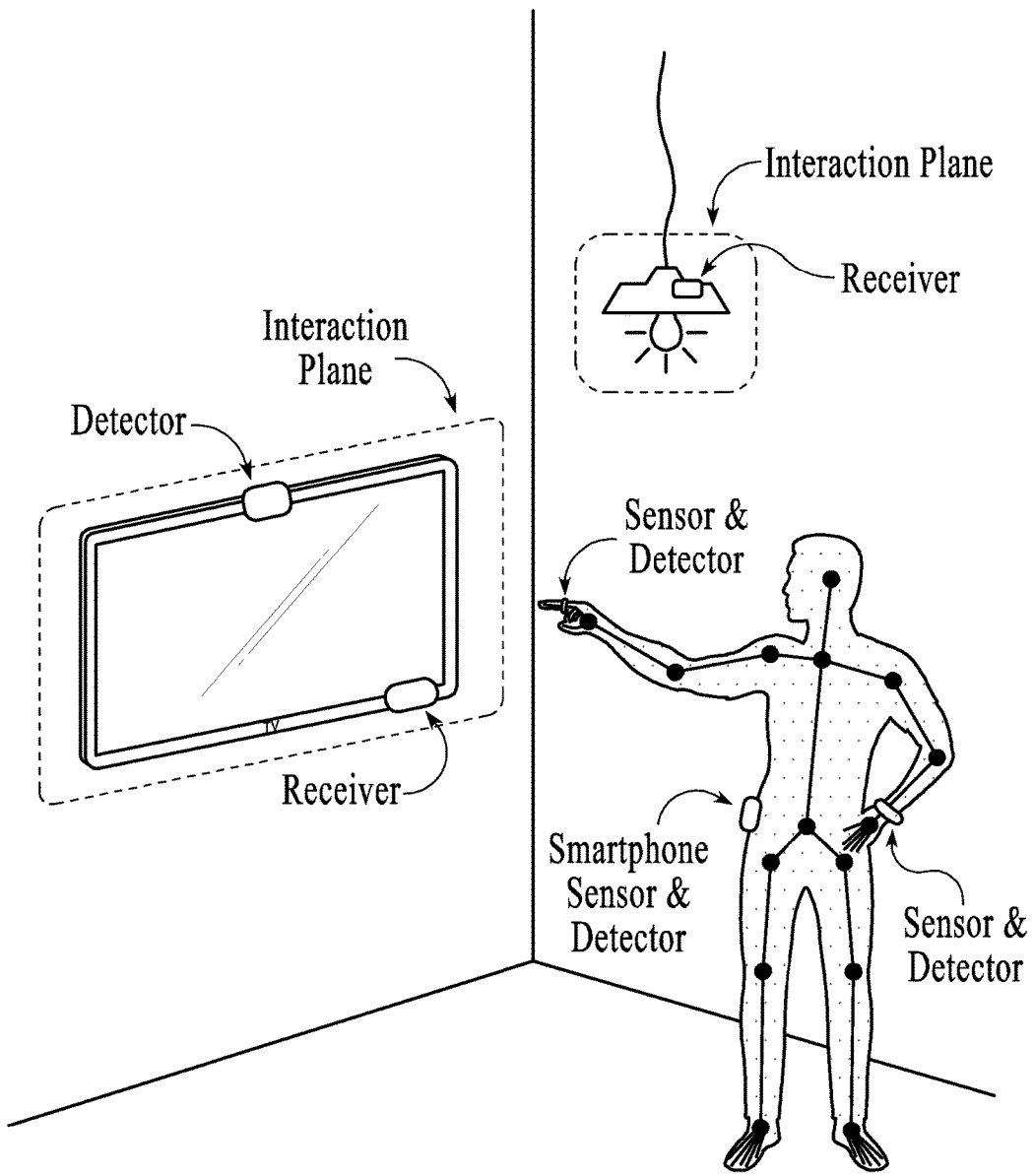
FIG. 1B/3

No selection:

| | | |
|---|---|---|
| Carmel Brulée Latte | 3.95 | 4.65 | 4.95 |
| Peppermint Mocha | 3.95 | 4.65 | 4.95 |
| Gingerbread Latte | 3.95 | 4.65 | 4.95 |
| Pumpkin Spice Latte | 3.95 | 4.65 | 4.95 |
| Salted Carmel Mocha | 3.95 | 4.65 | 4.95 |
| Carmel Macchiato | 3.95 | 4.65 | 4.95 |
| White Chocolate Mocha | 3.95 | 4.65 | 4.95 |

One selection:

| | | |
|---|---|---|
| Carmel Brulée Latte | 3.95 | 4.65 | 4.95 |
| Peppermint Mocha | 3.95 [Steve] | 4.65 | 4.95 |
| Gingerbread Latte | 3.95 | 4.65 | 4.95 |
| Pumpkin Spice Latte | 3.95 | 4.65 | 4.95 |
| Salted Carmel Mocha | 3.95 | 4.65 | 4.95 |
| Carmel Macchiato | 3.95 | 4.65 | 4.95 |
| White Chocolate Mocha | 3.95 | 4.65 | 4.95 |

Multiple selections:

| | | |
|---|---|---|
| Carmel Brulée Latte | 3.95 [Raphael|Michael] | 4.65 | 4.95 [Donatel] |
| Peppermint Mocha | 3.95 [Bart|Steve] | 4.65 | 4.95 [Lisa|Hom][Tony|Mark] |
| Gingerbread Latte | 3.95 [Bruce] | 4.65 | 4.95 |
| Pumpkin Spice Latte | 3.95 | 4.65 | 4.95 |
| Salted Carmel Mocha | 3.95 | 4.65 | 4.95 |
| Carmel Macchiato | 3.95 | 4.65 | 4.95 |
| White Chocolate Mocha | 3.95 | 4.65 | 4.95 |

FIG. 6

METHODS AND APPARATUS FOR PROVIDING SECURE IDENTIFICATION, PAYMENT PROCESSING AND/OR SIGNING USING A GESTURE-BASED INPUT DEVICE

RELATED APPLICATIONS

This application claims priority to U.S. Provisional Patent Application Ser. No. 61/924,685 filed Jan. 7, 2014, and is hereby incorporated by reference.

FIELD OF THE ART

This disclosure relates to methods and apparatus for providing secure identification, payment processing and/or signing using a gesture-based input device.

BACKGROUND

Many conventional devices provide for the secure identification of a user and secure payment processing. While adequate in many instances, further advancements, particularly with respect to gesture-based input devices, are needed especially devices which can provide multi-factor authentication without requiring biometrics.

SUMMARY

Described are apparatus and methods for providing secure identification, payment processing and/or signing using a gesture-based input device without biometrics.

BRIEF DESCRIPTION OF THE DRAWINGS

FIG. 6 illustrates a menu list and interactions with the menu list according to embodiments.

DETAILED DESCRIPTION OF THE PREFERRED EMBODIMENTS

Figure 1:
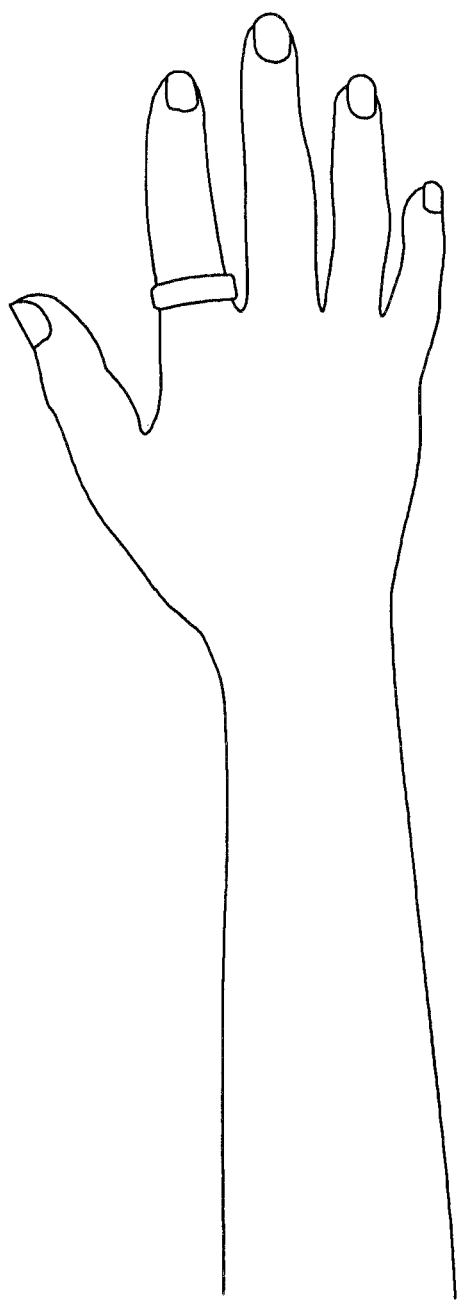
FIG. 1 shows an embodiment for micro-gesture recognition according to the embodiments.

Various devices such as computers, televisions, electronic devices and portable handheld devices can be controlled by input devices such as a computer mouse or keyboard. Various sensors such as accelerometers, gyroscopes, compasses and cameras can be collectively used (all from a substantially single point such as if disposed on a single ring; or from multiple different locations) to estimate and or derive a gesture, such as made with an arm, finger, hand, or combination thereof. These sensors dynamically provide data for varying periods of time when located in the associated space for sensing, and preferably stop or go into a low power mode when not in the associated space. When sensor data is unavailable, methods various calculations may be employed to reconstruct the skeletal structure without all the sensor data.

Various poses and gestures of the human skeleton over a period of time can be aggregated to derive information that is interpreted (either at the sensor or at the device) and communicated over wireless channels such as Bluetooth or Infrared to control various devices such as computers, televisions, portable devices and other electronic devices, as described further herein and in the previously filed U.S. patent application Ser. No. 14/487,039 filed Sep. 15, 2014, which claims priority to U.S. Provisional Application No. 61/877,933 filed Sep. 13, 2013 and entitled "Methods and Apparatus for using the Human Body as an Input Device", which are incorporated herein by reference.

Described herein are apparatus and methods for providing secure identification, payment processing and/or signing using a gesture-based input device.

In a preferred embodiment, MEMS sensors, and preferably a plurality of them within a substantially single location such as on a ring worn on a finger of a human hand, the writs of a human arm, or both, are used. MEMS sensors provide the advantage of not requiring a separate detector compared to conventional camera based depth sensors. A plurality of MEMS sensors can be used to obtain further information than would be possible with a single such sensor, as described herein. When further used in combination with accelerometers, gyroscopes, compasses, the data from the various sensors can be fused and interpreted to allow for sensing of micro-gestures, as described herein.

Such a single sensor can be integrated into everyday objects such as clothing, jewelry and wearable devices like fitness monitors or head mounted displays in order to use of the human body as a real-time input device that can interact with a machine in its surroundings.

Processing of all the data generated to accurately detect a gesture related to secure identification and/or payment processing or signing in real-time includes engineering desiderata of event stream interpretation and device power management, as well as usage of algorithms such as Kalman filtering, complementary filters and other conventional algorithms used to fuse the sensor data into coherent pose estimates. The filtering algorithms used are based on the locality of the sensor and factor in the human anatomy and the joint angles of the bones the sensors are tracking. The fused data is then processed to extract micro-gestures—small movements in the human body which could signal an intent, as described further herein.

Figure 1A:
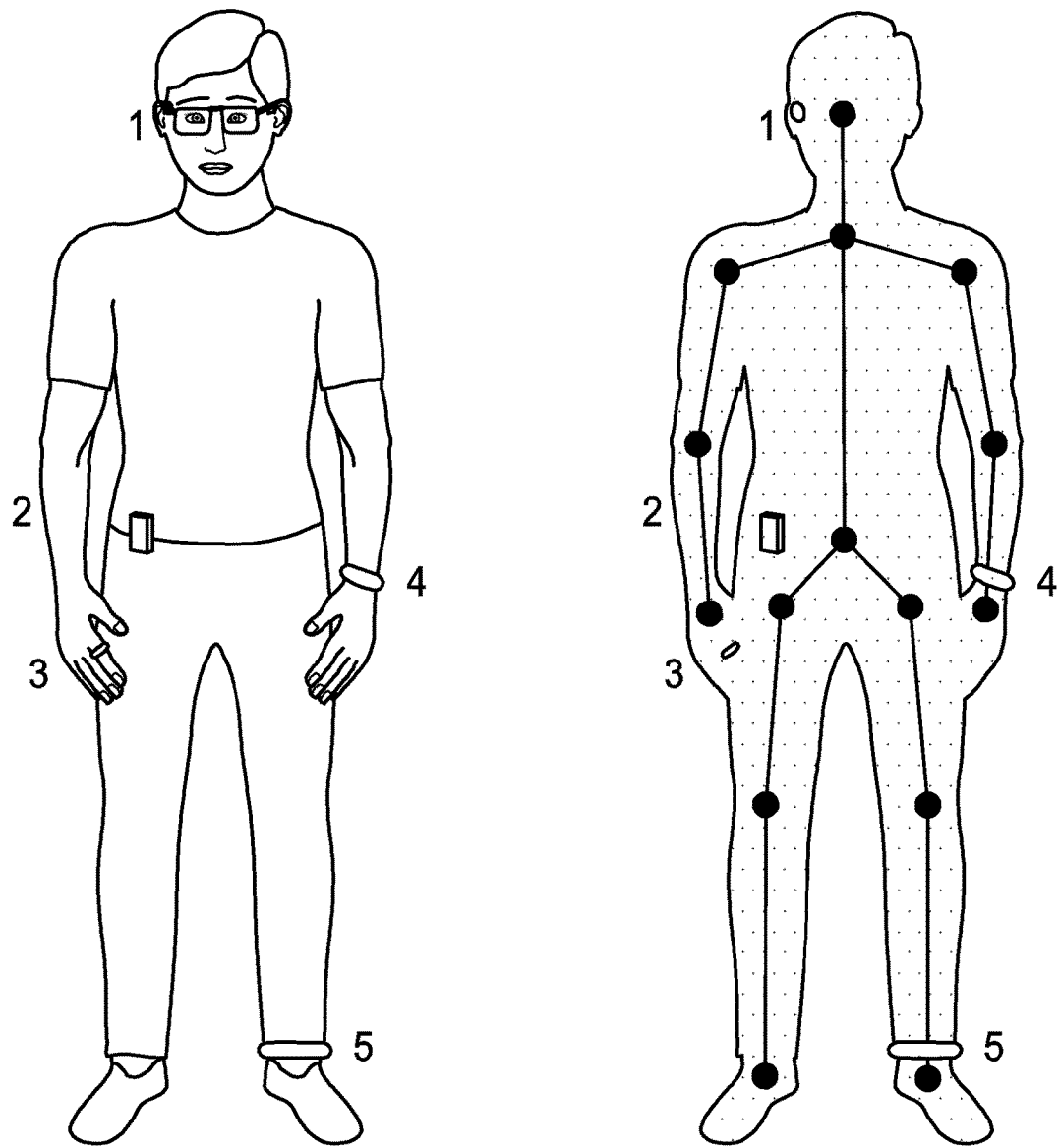
Figure 2:
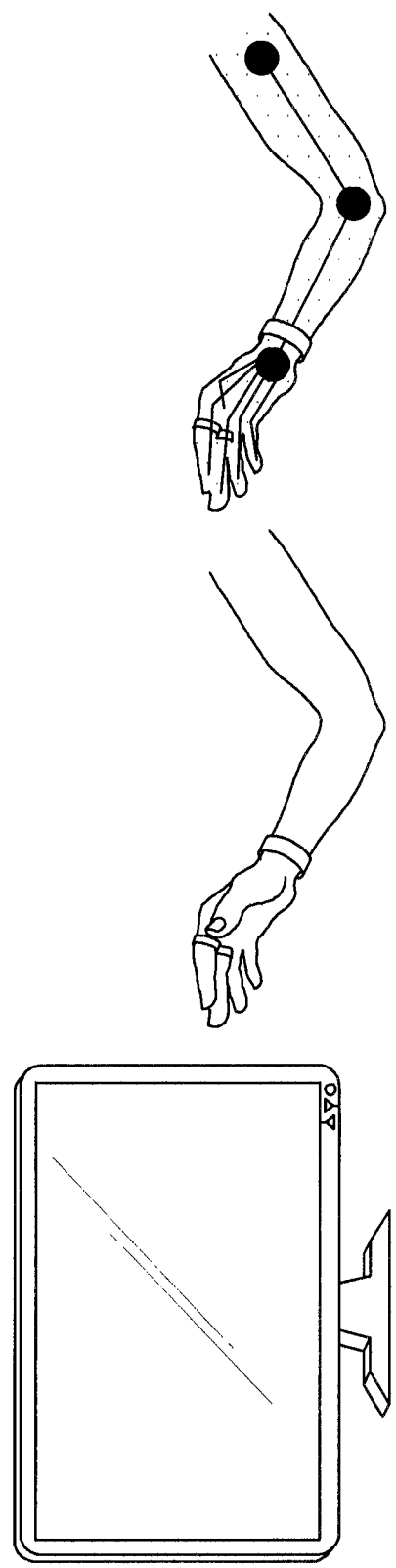
FIG. 2 shows an illustration of micro-gestures detected within a subspace that has its own relative coordinate system.
Figure 3:
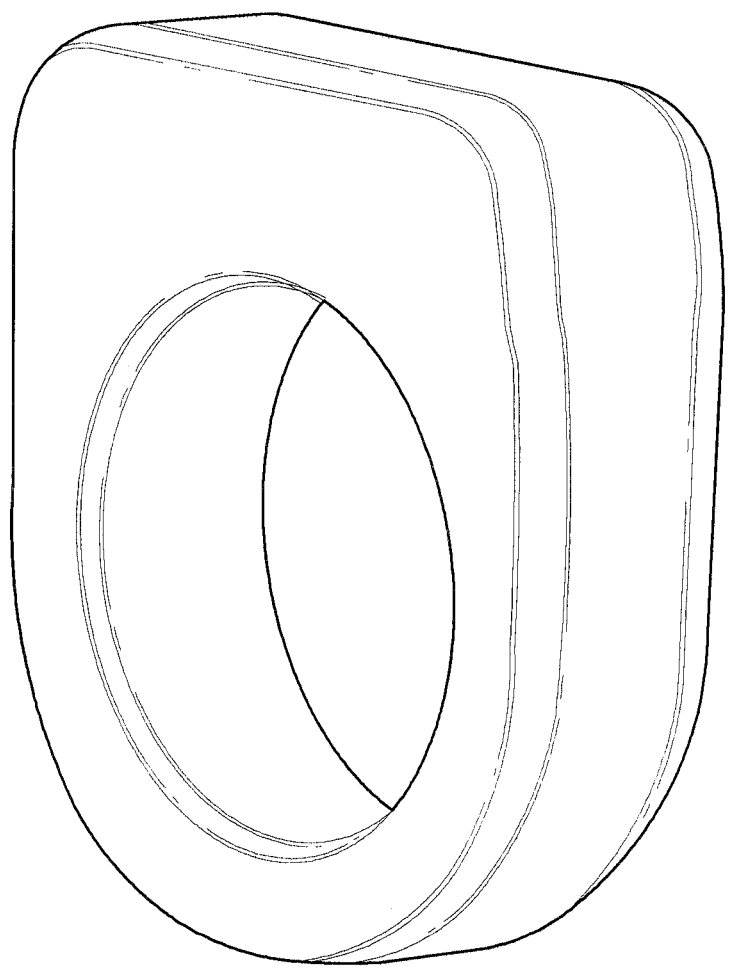
FIG. 3 illustrates a 3D exterior view of a single ring sensor.

These various aspects are shown in the diagrams attached. FIG. 1(A) illustrates the skeletal rendering of the human with various nodes, and the usage of many different sensors: one on the glasses (1), another on the belt (2), a third of a number of different sensors for fingers (3), one for the belt (4) and one on an ankle bracelet or attached to the bottom of the pants worn (5). FIGS. 1(B)(1-3) shows a similar space and rendering, and points out specific sub-spaces associated with different objects; each of which can have their own relative coordinate system if needed. As shown, FIG. 1(B)1 illustrates a system diagram with a laptop as a third controllable device, which laptop includes an interaction plane and is labeled as Computer Sensor & Receiver to illustrate that it can operate the software needed to fuse different sensor data together, as described elsewhere herein. FIG. 1(B)2 illustrates a system diagram with a laptop as well, but this laptop shown only as having an interaction plane, and operate upon a distributed system (such as with cloud processing). FIG. 1(B)3 illustrates an even simpler, which does not include the laptop at all within it. As is apparent, many different combinations are possible and within the contemplated scope herein.

As described herein, the single sensing device, also referred to as a wearable input platform can be configured as an identification device. This is enabled by uniquely registering each wearable platform to a specific user. Each wearable platform (or one if there are a plurality on the same person) can communicate with an identity verification system (not shown) via a suitable secure communication channel (e.g., Bluetooth) which authenticates the user using various conventional verification techniques, which may or may not include a look-up from a database of users linked to their devices.

The identification feature can also be applied for proximity based customization. For instance, when a user wearing the input platform walks up to a television, it can display custom information about the user, such as the user's favorite channels and further give the user the option to interface with the television, based on the displayed information. If two different users, each having different preferences, are each wearing a separate input platform configured for them, the system can be configured to detect the presence of both and then present various options that are based on both inputs. The identification feature can also be used when a user wearing the input platform walks up to a Point of Sale system such as in a coffee shop and is able to high a choice on a menu and order an item and the payment processing is done automatically on behalf of the user In terms of ensuring security of the wearable platform, there are several different aspects to implementation, which can be use together in a preferred embodiment:
a) each different wearable input platform can be disabled if lost or stolen at the identity verification system;
b) conveyance of identification information is performed through secure channels;
c) multiple factor identification can be used.

As to multiple factor identification, this can be implemented in a variety of manners, which if all used together make for an even more secure authentication and/or identification.

A 2 factor authentication can be implemented using biometrics for a single one of the wearable input platforms—in one embodiment, where the wearable platform is a ring, it could potentially be used to capture fingerprints or as a pulse oximeter, etc. and compare to known metrics in a database for a given user.

In another aspect of multiple factor authentication, if a single user has multiple wearable input platforms (i.e. two rings, or a ring and a wrist bracelet, or two rings and a belt buckle, for example) then the combination of these variable input platforms can be used to create an authenticating single token that is sent to the identification system, such that each of the different wearable platforms must be on the person for the authentication to work. In addition, a non-wearable input platform, such as a smartphone, can be used in conjunction in this regard as well.

Still further, one gesture or touch/tactile input or a combination thereof can be used to unlock an associated smartphone, whereas a different gesture can be used to type an email password and a different gesture could be used to unlock your front door or garage In a further enhancement, a biometric fingerprint sensor or other personal characteristic sensor can be added to a wearable input platform as described herein for even further security.

In terms of payments, it is possible to associate a particular user's wearable input platform with multiple credit cards and use the device to make payments. In one embodiment, where the wearable input platform is a single ring, the single ring can be worn by the user and pointed at a screen to enable secure payment. If that user has multiple wearable input platforms, while one of the rings can be configured as the master and used to make the payment, the proximity existence to and communication with the other associated wearable and/or non-wearable input platforms may be used in order to perform the transaction.

One can extend this secure payment concept to other types of cards, such as ATM cards, insurance cards, customer loyalty cards, etc. All of these cards could be linked to the individuals input device(s) as described above, in which the device (or devices if required) become the card, which can be used with the equivalent of a card reader to enable authentication and payments.

The convenience of having a wearable device which includes an identification feature coupled with security and payments processing is significant, as it makes carrying a physical wallet consisting of identification cards, credit cards, keys etc. redundant.

In another aspect, which can be used in conjunction with the payment aspect mentioned above, as well as in other applications requiring signing, many different types of wearable devices, and in particular a ring-based single sensing device, can be used for handwriting, with a specific targeted use for signing legal documents, though gestures for capturing any handwriting, particularly roman-based languages cursive handwriting or complex characters in mandarin, for example, are within the intended scope. Typically, the user simulates handwriting with the finger, while wearing the wearable sensing device and the movements are captured, tracked, and processed accurately, to generate a handwriting trace, preferably on the UI of the device being interacted with. As a further enhancement, the signature traces can then be analyzed and text predicted from them.

In the modern world, where electronic versions of documents are moved online, signatures are captured conventionally in many ways, such as through a rough diagram drawn on screen (using mouse, stylus or digital pen), scanning the signature and re-using it, or using an IP address and/or SSN as a validated digital signature.

In the embodiment described herein based specifically on a ring-based single sensing device (with it being understood that other wearable sensing devices can be used as well), the fore-finger, which does most of the movement of the pen to generate the handwriting pattern conventionally, is used with a ring sensor attached thereto to generate a handwriting pattern, as if there was a pen at its tip, and could even generate an accurate signature.

A sensing device ring on the fore-finger provides a very fine and precise control for the user to generate a signature, although it is understood other wearable sensing devices can be used as well. The person can wear the ring or other wearable sensing device, and just move his/her fingers on a flat surface to accurately control, for example, an associated mouse pointer on a document screen.

This is useful in many scenarios, particularly where the user doesn't need to electronically receive/download the document in question to his local computer/laptop/mobile. Rather then receive/download and then sign and then transmit back to the originator, the user can pair his sending device ring or other wearable device to any computer, and just sign off his/her document using the signature upon reading the document that is shown on the screen. A screen, however, is not even necessary, and the sign-off can be used to verify agreement based upon various different inputs. For example, a signature could be used itself as a verification gesture to then cause a command to occur.

Further, if the sensor ring or other wearable device is equipped with identification information of the user that can be validated during registration (such as SSN or national identity from other countries), then it may also be configured to suffice as a legal signatures for government purposes.

FIG. 1 shows an embodiment for a single gesture recognition device in the form of a single ring. Other configurations for the single device wearable in different ways (i.e. wrist, ankle, belt buckle, pin, and the like, are possible and within the intended scope herein.

FIG. 2 shows an illustration of a gesture being detected within a subspace around a computer, which sub-space can have its own relative coordinate system and/or one relative to the arm, which can then obtain 2D data from a 3D projection onto a 2D space, as described in the U.S. Provisional Application 61/924,669 entitled "Methods and Apparatus for Mapping of Arbitrary Human Motion Within an Arbitrary Space Bounded by a User's Range of Motion" being filed today, expressly incorporated by reference herein, and attached as Attachment 2, as well, rather than being based upon absolute coordinates. In addition to the MEMS sensors in each ring, acceleration can also be used to detect distance from a relative reference point, such as the screen of the computer. Further, the beginning and end of gestures can be used to determine what is the actual "gesture" to be detected, as described in the U.S. Provisional Application 61/924,682 entitled "Methods and Apparatus Recognition of Start and/or Stop Portions of A Gesture Using an Auxiliary Sensor" being filed today, expressly incorporated by reference herein, and attached as Attachment 3.

Figure 4:
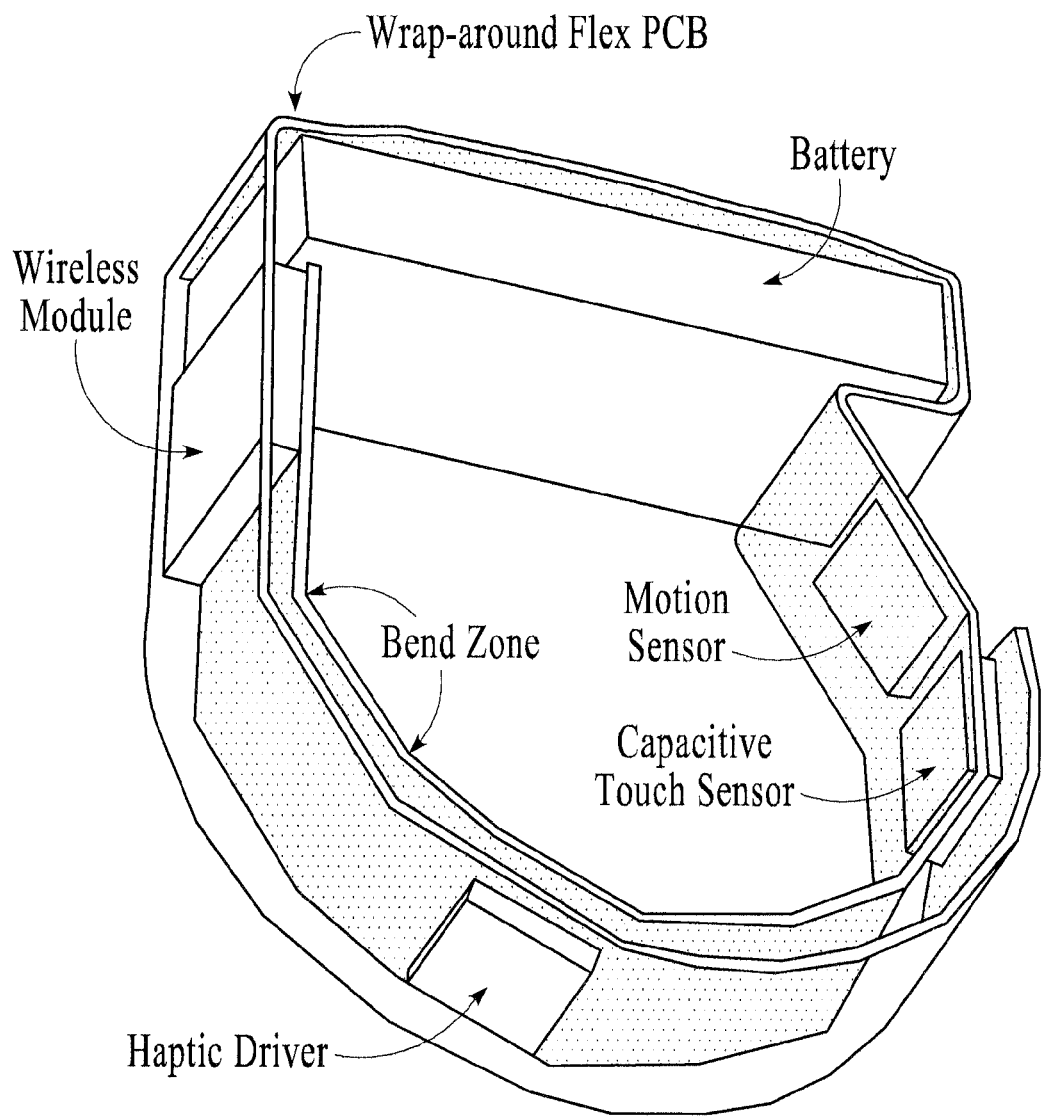
FIG. 4 illustrates a more detailed view of the ring sensor of FIG. 3.

FIG. 3 illustrates a 3D exterior view of a single ring sensor, and FIG. 4 illustrates that ring sensor in a more detailed view, with the significant electronic components identified, and which are connected together electrically as a system using a processor, memory, software as described herein, including other conventional components, for controlling the same. The processor controls the different sensors on the ring device and is in charge of detecting activity in the various sensors, fusing the data in them and sending such data (preferably fused, but in other embodiments not) to other aggregators for further processing. While shown as a ring sensor, this combination of elements can also be used for the other sensors mentioned herein—though other combinations can also be used.

Figure 5:
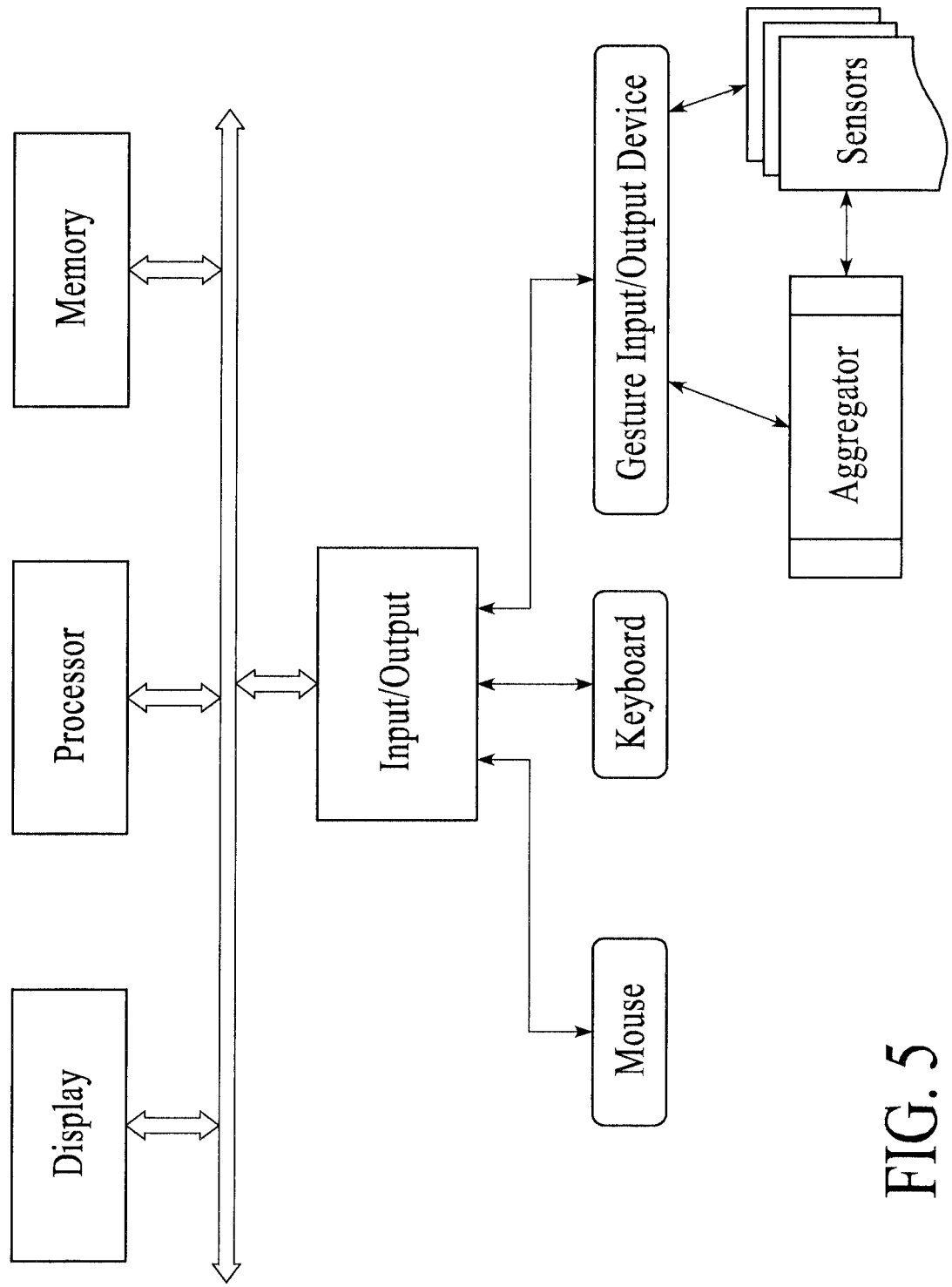
FIG. 5 illustrates a computer sensor & receiver according to the embodiments.

FIG. 5 illustrates a Computer Sensor & Receiver that can obtain input from and sound outputs to different devices, including a single sensing device referred to as the Gesture Input/Output Device. As illustrated in FIG. 5, included is a processor, memory and display that are used as is conventionally known. The processor controls the different sensors on the various devices and can fuse the data from disparate devices that has been aggregated previously or not, and send such data (preferably fused, but in other embodiments not) to other aggregators for further processing as well as send control signals based on the what has been detected to control devices. I/O devices as known are also included, as well as what is labeled a Gesture Input/Output Device and an Aggregator coupled thereto (which Aggregator may be part of the Gesture Input/Output Device, or the Computer Sensor and Receiver or could be located elsewhere, such as on a wrist sensor as described above). The Aggregator can be implemented in hardware or software to process the various streams of data being received from the various sensors that are typically on a single Gesture Input/Output Device in a preferred embodiment. The Aggregator factors in location of the sensor (e.g: on the finger or wrist etc.) and calculates what data is relevant from this sensor. This is then passed on to the Gesture Input/Output Device (which could also reside across a wireless link) to control various computing devices.

The device that could be worn on the ring could possess a Capacitive Touch surface on the exterior of the device (preferably the entire exterior surface) and a Capacitive Touch detector enclosed in the inside the device. The device can possess a haptic actuator and associated circuitry to be able to provide a haptic feedback based on user engagement with a computing device. The device can also support various forms of wireless networking such as NFC, Bluetooth and/or WiFi to be able to interact with various other devices in its surroundings.

Multiple sensors can interact with each other providing a stream of individually sensed data. For example a sensor worn on the ring can communicate with a wrist worn device or a smartphone in the pocket. This data could then be aggregated on the smartphone or wrist worn device factoring in the human anatomy. This aggregation may factor in range of motion of the human skeletal joints, possible limitations in the speed human bones could move relative to each other, and the like. These factors, when processed along with other factors such as compass readings, accelerometer and gyroscope data, can produce very accurate recognition of gestures that can be used to interact with various computing devices nearby.

FIG. 6 illustrates a "Coffee Menu" list that illustrates how gestures are integrated with point of sale systems. A "No Selection" indicates that no gesture for a menu has been made, "One Selection" indicates that one gesture for a menu selection has been made by one person (Steve). "Multiple Selections" indicates that one gesture for a menu selection has been made by multiple persons (Raphael, Michael, Donatello, Bart, Steve, Lisa Homer, Tony, Marge and Bruce). Of course a single person can also have multiple different gestures (orders) detected.

Although the present inventions are described with respect to certain preferred embodiments, modifications thereto will be apparent to those skilled in the art.

The invention claimed is:

1. A method for authenticating a user interacting with at least one controllable system that includes a processor and memory, without biometric data, the method comprising:

sensing, using a plurality of sensors that are sized for wearing on the human body, sensor data that does not include biometric data therein, wherein at least some of the plurality of sensors are packaged in an integrated mechanical assembly sized for wearing on the human body and that forms at least a portion of the at least one controllable system; and authenticating the user interacting with the at least one controllable system based upon a predetermined authentication token that includes at least a first portion and a second portion, with both the first portion and the second portion being required for authentication to occur, wherein the first portion of the authenticating token is a pose, and wherein the pose is determined based upon a locating of determined ones of said plurality of sensors, using characteristics of human anatomy to determine the pose, wherein the characteristics of human anatomy that are associated with the human body that are stored in the memory include at least one of (a) a range of motion of human skeletal joints and (b) limitations in the speed human bones can move relative to each other; the step of authenticating based upon the sensor data, under control of the processor and software, the step of authenticating operating to:
input a first set of sensor data associated with the first portion of the authenticating token;
input a second set of sensor data associated with the second portion of the authenticating token;
correlating the first set of sensor data and the second set of sensor data to determine if the authenticating token is complete, and
providing an authenticating signal if the authenticating token is complete; wherein the step of authenticating includes inputting, aggregating and fusing the sensor data from certain ones of the plurality of sensors.

2. The method according to claim 1 wherein the second portion of the authenticating token is a predetermined signal that is stored within the integrated mechanical assembly.

3. The method according to claim 1 wherein the second portion of the authenticating token is a predetermined signal that is stored within a second integrated mechanical assembly that is distinct from the integrated mechanical assembly.

4. The method according to claim 3 wherein the second integrated mechanical assembly is sized for wearing on the human body.

5. The method according to claim 3 wherein the second integrated mechanical assembly is a smartphone.

6. The method according to claim 1 wherein the second integrated mechanical assembly is a wearable device other than a ring, and is one of a clothing, bracelet, belt, necklace and earring.

7. The method according to claim 6 wherein the integrated mechanical assembly is a ring.

8. The method according to claim 1 wherein the pose is a gesture that is obtained from a sequence of poses.

9. The method according to claim 1 wherein the first portion of the authenticating token is a predetermined signal that is stored within the integrated mechanical assembly and wherein the second portion of the authenticating token is another predetermined signal that is stored within a second integrated mechanical assembly that is distinct from the integrated mechanical assembly.

10. The method according to claim 1 wherein the second integrated mechanical assembly is sized for wearing on the human body.

11. The method according to claim 10 wherein the second integrated mechanical assembly is a wearable device other than a ring.

12. The method according to claim 11 wherein the integrated mechanical assembly is a ring.

13. The method according to claim 11 wherein the second integrated mechanical assembly is one of a clothing, bracelet, belt, necklace and earring.

14. The method according to claim 13 wherein the second integrated mechanical assembly is a smartphone.

* * * * *